United States Patent [19]

Ball

[11] Patent Number: 5,219,225
[45] Date of Patent: Jun. 15, 1993

[54] ELECTRONIC TRIPLE POINT CELL

[75] Inventor: John M. Ball, Huntsville, Ala.

[73] Assignee: The United States of America as represented by the Secretary of the Army, Washington, D.C.

[21] Appl. No.: 905,706

[22] Filed: Jun. 29, 1992

[51] Int. Cl.$^5$ .......................................... G01K 15/00
[52] U.S. Cl. ...................................... 374/1; 62/228.2
[58] Field of Search .................. 374/1, 3, 163, 208; 73/1 R; 62/228.2

[56] References Cited

U.S. PATENT DOCUMENTS

| | | | |
|---|---|---|---|
| 2,162,614 | 6/1939 | Fry et al. | 374/1 |
| 2,573,437 | 10/1951 | Harbison | 374/1 |
| 4,011,552 | 3/1977 | Quirke | 374/1 |
| 4,523,859 | 6/1985 | Bonnier et al. | 374/1 |
| 4,655,050 | 4/1987 | Aschberger et al. | 62/228.2 |

FOREIGN PATENT DOCUMENTS

| | | | |
|---|---|---|---|
| 2590981 | 6/1987 | France | 374/1 |
| 1415082 | 8/1988 | U.S.S.R. | 374/1 |

OTHER PUBLICATIONS

J. J. Quinn, "Temperature", Academic Press Inc., Orlando, FL (1983), p. 161.
"Instructions for the Preparation and Use of Triple-Point-of-Water Cells", by Jarrett Instrument Co., Inc. (1970).
John L. Riddle et al, NBS Monograph 126, "Platinum Resistance Thermometry" pp. 1-4, 29-31, (U.S. Government Printing Office, Washington, D.C. 20402, Apr. 1972.
Section X, p. 10, "The Water Triple-Point Maintenance Bath" by Yellow Springs, Inc. (Date Unknown).

Primary Examiner—William A. Cuchlinski, Jr.
Assistant Examiner—G. Bradley Bennett
Attorney, Agent, or Firm—Hugh P. Nicholson; Freddie M. Bush

[57] ABSTRACT

An electronic triple point calibration system comprising in combination triple-point-of-water cells provided with means for sealing; a central thermowell provided in the heat conducting fixture for inserting thermometer being calibrated; a temperature probe installed on heat conducting fixture; and a housing for enclosing the heat conducting fixture and intimately mounted cells in a mounted combination. The cells are prepared from glass, polytetrafluoroethylene, or other material which does not react with water. After thoroughly cleaning, the cells are partially filled with pure water and vacuum sealed. A plurality of cells are intimately mounted on the heat conducting feature designed to accommodate the outer contours of the cells equally spaced around the central thermowell. The mounted combination with cells installed is frozen prior to testing. The electronic triple point calibration system temperature probe during testing is connected to measuring means for measuring millivolt output equivalent to temperature values in determining the triple-point-of-water temperature. The electronic triple point calibration system further comprises for automated operation a DC control system electrically connected to the temperature probe, a DC switching means for receiving millivolts output, from the temperature probe, and refrigeration means including control system for freeze control with operational circuitry including associated DC switches, relays, and contacts for generating and maintaining the triple-point-of-water temperature in the central thermowell.

3 Claims, 2 Drawing Sheets 5,219,225

ELECTRONIC TRIPLE POINT CELL

DEDICATORY CLAUSE

The invention described herein may be manufactured, used, and licensed by or for the Government for governmental purposes without the payment to me of any royalties thereon.

BACKGROUND OF THE INVENTION

The current state-of-the-art for fixed temperature cells employ the temperature of the triple-point-of-water as a defined fixed point common to the International and the Kelvin Temperature scales. This defined fixed point is the temperature of pure water, ice, and water vapor in thermal equilibrium. This temperature has the assigned value of +0.01° C. on the International Practical Temperature Scale of 1948, and the value of 273.16° K. on the Kelvin scale.

Representative state-of-the-art, triple-point-of-water cells are the Jarrett cells which consist of cylindrical borosilicate glass containers with a reentrant tube which serves as a thermometric well. The cells are thoroughly cleaned, filled with high purity gas-free water, and then sealed.

Prior to use, the cells are frozen by employing a manual process with dry ice for refrigerating the inside of the reentrant thermometer well so that the water freezes from the thermometer well outward to form a mantle of ice around the well. Great care and expertise are required to prevent catastrophically rupturing the cell.

A typical triple-point-of-water cell, such as the Jarrett cell when in operation, requires a vertical operational technique; i.e., the complete assembly is mounted vertically. The complete assembly includes an outer container for housing an ice and water mixture for maintaining an inner suspended cell at ice, and water, and water vapor equilibrium temperature. The triple-point-of-water cell consists of a cylindrical borosilicate glass container with a reentrant tube which serves as a thermometer well. The cells are prepared by thoroughly cleaning, filling with high purity gas-free water, and then sealing. The cell is usually provided with a brass or aluminum metal bushing near the bottom of the thermometer well for supporting a thermometer being calibrated or tested in a vertical position so that the bulb is held off the bottom of the thermometer well. Another purpose of the metal bushing is to increase the thermal conduction between the thermometer and the ice-water interface. A well established equilibrium condition is guaranteed to be within +0.000,00° or −0.000,15° C. of the triple point of pure ordinary water.

The conventional typical triple-point-of-water cell requires a central thermowell and the delicate process of generating an ice mantle. These cells are extremely fragile and must be carefully handled and stored to prevent breakage. The vertical technique employed in conventional triple-point-of-water cell results in a tendency, as the ice melts around the thermowell, to cause the ice mantle to come loose and float up and away from the thermometer tip. This tendency of losing the ice mantle from the vicinity of the thermometer tip results in a decrease of the useful time for the conventional cell since the whole equilibrium condition is based on achieving the condition of pure water, ice, and water vapor in thermal equilibrium with the temperature of an assigned value of +0.01° C.

The need for a more practical, rugged, device to replace the delicate, awkward, and expensive to maintain triple-point-of-water cell is evident.

Therefore, an object of this invention is to provide a calibration system having a plurality of individual cells which are mounted together in thermal contact with a heat conducting fixture having a central thermowell for inserting the thermometer which is being calibrated by the calibration system.

Another object of this invention is to provide a calibration system which provides for positioning the bulb of the thermometer at a more horizontal position rather than vertical whereby the bulb of the thermometer is positioned a few degrees above horizontal so that any ice melts tends to float upward in the vicinity of the bulb of the thermometer.

Still, a further object of this invention is to provide an electronic triple point calibration system having freezing means for generating the triple-point-of-water temperature, or alternately after cells are frozen for use, the electronic triple point calibration system is maintained for ready use by an electronic freezing point system which is automated through temperature sensing means, switching means, and refrigerating means for generating or regenerating the triple-point-of-water temperature equilibrium conditions thereby maintaining same equilibrium conditions in a ready for use state.

SUMMARY OF THE INVENTION

The electronic triple point calibration system of this invention is comprised of a plurality triple-point-of-water cells, a heat conduction fixture for mounting the triple-point-of-water cells around a central thermowell for receiving a thermometer for calibration; a housing for containing the triple-point-of-water cells in a mounted combination; a temperature probe, sensing, and control system which is electrically connected to circuitry including switching means responsive to small electronic output changes of a predetermined value to determine requirements for operating a refrigeration system in a cyclic operation to maintain the triple-point-of-water cells; and a refrigeration system responsive to the switching means for cylic operation for maintaining the triple-point-of-water temperature.

DESCRIPTION OF THE PREFERRED EMBODIMENT

The electronic triple point calibration system is comprised of triple-point-of-water cells, a heat conducting fixture designed to accommodate the outer contours of a plurality of cylindrical cells and for intimately mounting the triple-point-of-water cells around a central thermowell having a closed base end and an open end contained in the heat conduction fixture for receiving a thermometer into a central thermowell during calibration. A housing contains the triple-point-of-water cells in its mounted relationship. The housing member performs the function of protecting the cells in its mounted combination in storage and in a frozen environment during thermometer calibration. A temperature probe such as a DC sensor manufactured by Analog Device Company, AD592, is installed near the base of the central thermowell or the thermometer calibration well so the device is able to sense the temperature in equilibrium with the thermometer bulb. The temperature probe is electrically connected to DC control system which outputs a small voltage to switching means responsive to small output changes of a predetermined value which determines the requirements for a refrigeration system operation in cyclic operation to maintain the triple-point-of-water cell. A refrigeration system responsive to switching means for cyclic operation for maintaining the triple-point-of-water cells is employed where a ready condition for thermometer calibration is desired.

Figure 1:
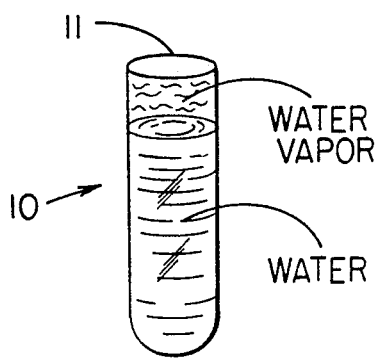
FIG. 1 depicts a sealed, triple-point-of-water cell 10, containing pure water and water vapor prior to being frozen.
Figure 2:
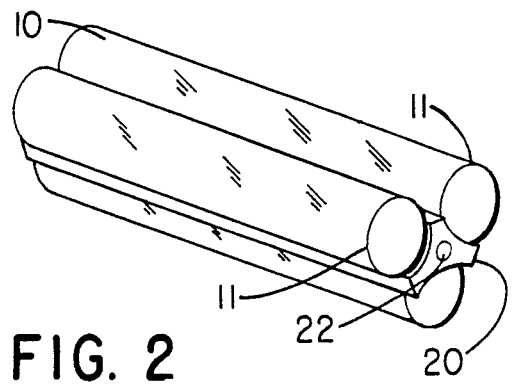
FIG. 2 depicts a heat conducting fixture 20 supporting a plurality of cells 10, and containing an internal, centered calibration thermometer well 22.
Figure 3:
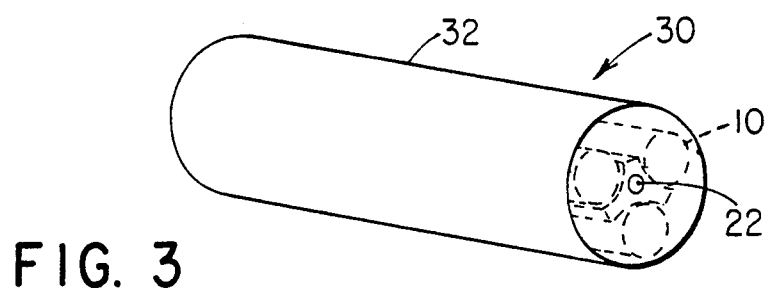
FIG. 3 depicts the triple-point-of-water cells 10 in a mounted combination 30 with a heat conducting fixture 20 within a housing member 32.
Figure 4:
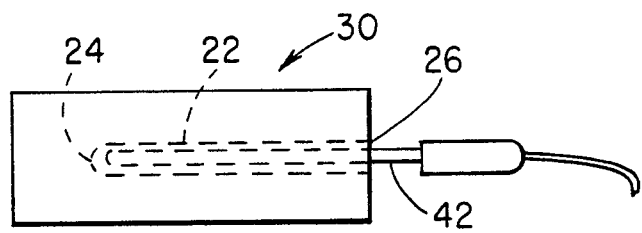
FIG. 4 depicts a thermometer 42 inserted in the internal, centered calibration thermowell 22 in a mounted combination 30 slightly tilted downward toward the calibration thermometer well entrance end.
Figure 5:
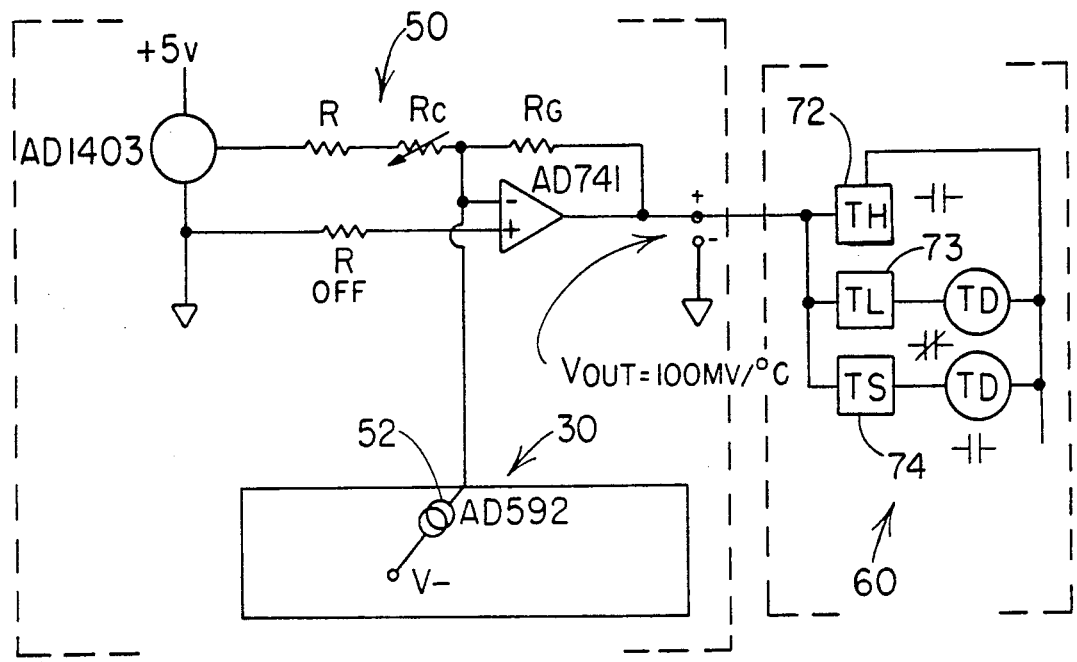
FIG. 5 depicts a DC control system 50 including temperature probe 52 and circuitry for electronic triple-point-of-water calibration system in combination with DC switching means 60 for receiving millivolt output (Vout) from DC control system 50.

In further reference to the Figures of the Drawing, FIG. 1 depicts a simple cylinder cell 10, partially filled with pure water, and sealed under vacuum by sealing means 11. The cylinder is made from high purity glass, polytetrafluroethylene, or other material which does not react with water. The process for preparing the cell is similar to the process used in home canning, and vacuum sealing takes place as the cell cools, as with fruit jars for example, to result in water and water vapor in equilibrium in a sealed container. When unfrozen and later, when frozen and allowed to melt somewhat, ice, water, and water vapor equilibrium is established in a sealed container. As illustrated in FIG. 2, a plurality of cells 10 are positioned on the heat conducting fixture 20. A calibration thermometer well or thermowell 22 having a closed base end 24 and an open entrance end 26 enables a thermometer 42 to be inserted during testing as shown in FIG. 4. FIG. 3 depicts three cells mounted or supported by the heat conducting fixture 20 as depicted in FIG. 2; however, only the outline of the top portion of cells 10 are shown along with the position of thermometer well. The mounted combination 30 is shown within housing member 32. For electronic control and stabilizing, a temperature probe 52 is installed in the heat conducting fixture 20 with electrical hook-up as shown in FIG. 5. FIG. 4 depicts thermometer 42 inserted in the internal, centered calibration thermowell 22 in the mounted combination 30 which is mounted almost horizontally, but slightly tilted downward toward the calibration thermometer well entrance end. The tilted position avoids the potential chance for error as in a prior art cell which is mounted vertically, and when ice melts around the thermowell, the mantle comes loose and floats up and away from the thermometer tip. In the tilted position design, as the ice melts within the cells, the ice tends to float upward, remaining at the thermometer tip for the entire melting cycle. This feature spreads out the useful time for the electronic triple point calibration system.

After the cells have been prepared and positioned in the housing, the whole mounted combination 30 is placed in a freezing unit until ready for use. The electrical output in millivolts from the thermometer under test can be observed, recording values once the output has stabilized (which means that the ice has begun to melt and the triple point has been achieved). Once the output from the thermometer under test begins to again change, the cells should be removed, placed in normal refrigerated freezer, refrozen, and replaced in the unit. It would probably be normal practice to have other cells in the freezer until they are needed to be used or during a test, if indicated.

FIG. 5 depicts mounted combination 30 in combination with a DC control system 50 including temperature probe 52 and circuitry for electronic triple-point-of-water calibration system which is in combination with a DC switching means 60 for receiving millivolt output(Vout). Switches TH(72), TL(73)+TD, and TS(74)+TD with assigned members are also shown in relationship with compressor control system 70 of FIG. 6.

Figure 6:
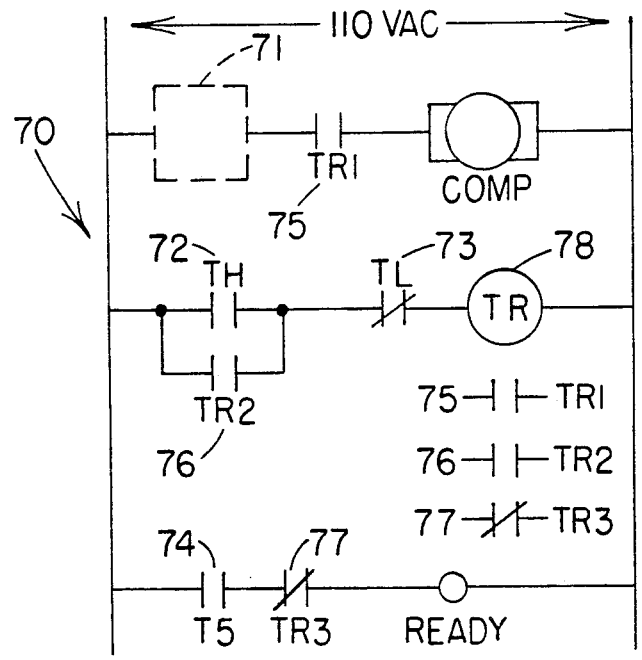
FIG. 6 depicts compressor control system 70 for freeze control 71 with operational circuitry including associated DC switches, relays and contacts.

FIG. 6 depicts compressor control system 70 for freeze control 71 with operational circuitry including associated DC switches, relays, and contacts illustrated in FIG. 5.

As previously described, the mounted combination 30 including a temperature probe or sensor 52 is mounted in heat conducting fixture 20 directly at the base end of the thermowell as shown in FIG. 5 which enable use of the invention apart from the electronic automated features illustrated in FIG. 5 and FIG. 6. This use can be achieved by recording electrical output from the temperature probe near the thermometer bulb. Stabilized temperature reading from a previously frozen cell means that the ice in the cells has begun to melt and the triple point has been achieved.

The analog devices Nos. AD1403, AD741, and AD592, available from Analog Devices Company are illustrative of how the mounted combination is functional with electronic means which automates the triple point process as further described hereinbelow. The electronic section is not limited to the analog devices shown but is illustrated to show the system is constructed employing AD1403 (chip), AD592 (temperature probe) and AD741 (amplifier and control means to achieve voltage out (Vout) of a predetermined value equal to about 100 mv/° C.) thereby enabling accurate measurement required for the triple point process.

The electronic section of FIGS. 5 and 6 automates switches depicted in switching means 60 which senses voltage of the DC from temperature probe 52 to output voltage (Vout). The function of the switches TH, TL, and TS are now described in accordance with setpoint values and temperature values relative to the triple point. "TH" closes a set of contacts when the output voltage is higher than the setpoint, say 10 mv for the configuration shown, equivalent to about 0.1 degree C. "TL" opens a set of contacts when the temperature is low, below −0.1 degree C. TL also has an adjustable time delay (TD) before opening. FIG. 6 illustrates how these two switches operate a relay, "TR", to control a standard, commercially available cooling unit. (This could be a desk top freezer, for example, with a hole cut in to allow access to the triple point assembly which is placed inside.) The final switch, "TS" is set as close as possible to 0.01 degree centigrade, the temperature generated by a triple point, and set to close when the output from Vo is stable and has been stable for an adjustable time. As shown in FIG. 6, this switch turns on a light to indicate that the unit is generating the triple point temperature and ready to operate.

Refer to FIG. 6 and associated numerals in conjunction with cycle description beginning with unfrozen cells assembled with fixture and in their housing, mounted at a slight angle shown in FIG. 4. The entire assembly is placed inside a refrigerating unit or otherwise exposed to refrigeration. FIG. 6 shows the standard control unit for the freezer. "Comp." is a mechanical compressor, thermoelectric refrigeration unit, or some other cooling device of sufficient capacity. Because the cells are not yet frozen, the temperature switch TH(72) will be closed, TL(73) will also be closed, so the control relay, TR(78), will be pulled in. Contact TR1(75) allows the compressor to run and also latches TR(78) in through contact TR2(76). As the compressor runs, temperature drops and the water in the cells begins to freeze, generating a triple point, but the "READY" light does not come on because contact TR3(77) is open. (We do not want the "READY" light to come on while the compressor is running because we want the cells to freeze solid.) Eventually, the cells freeze solid and the ice temperature begins to drop rapidly, falling below the set point, 0.01 degree, continuing to fall past the setpoint for relay TL(73), about −0.10 degree in this example, and starting the time delay for TL(73), after which time contact TL(73) opens, dropping relay TR(78) off line, and turning off the compressor. Without cooling, the temperature drifts slowly up, past the temperature which trips TL (73), and toward the set point. Now the condition exists that both contacts TL(73) and TH (72) are closed. When ice begins melting, a long period of extremely stable temperature begins due to the large heat of fusion of ice. The setpoint has been reached, 0.01 degree C., the rate of change of Vo is zero, and , after a time delay to ensure that the rather crude temperature sensor which detects this temperature is really seeing a stable temperature (which can only happen at the triple point), contact TS(74) closes and the calibrate light comes on. The unit is ready to use until the rate of change (derivative) of Vo begins again to be non-zero and the light goes out. The unit continues to warm until it reaches the value to trip TH(72) and the cycle repeats.

Variations in the control scheme which maintain the freeze, melt, slowly thaw, pause at the triple point, and then melt, refreeze are to be allowed.

Typical values for resistors and conditions illustrated in FIG. 5, DC control system 50 are as follows:

$R_G = 100K$ ohms
$R_{OFF} = 9.1K$ ohms
$R + R_C = R_{OFF} = 9.1K$ ohms

Typical switch set values are as follows:

TH(72) closes when Vout > 10 mv

TL(73) opens when Vout < 10 mv (also includes adjustable time delay to open)

TS closes when Vout is between +1 mv and rate of change of Vout has held at zero for an adjustable time.
TD means adjustable time delay relay which is tied in with switches TL and TS.

Also, the position of contacts are indicated by assigned reference numerals 72, 73, and 75 in FIG. 5, and the position of contacts for relays TR1, TR2, and TR3 are indicated by assigned reference numerals of FIG. 6.

I claim:

1. An electronic triple point calibration system for calibrating thermometers at the triple-point-of-water standards for temperature, said system comprising in a mounted combination:
   (i) a plurality of cylindrically shaped, triple-point-of-water cells, partially filled with pure-water and vacuum sealed, said triple-point-of-water cells being individual cells which are individually mounted with a heat conducting fixture and which are individually removable from said heat conducting fixture, said heat conducting fixture designed to accommodate the outer contours of each of said triple-point-of-water cells;
   (ii) a heat conducting fixture designed for substantially horizontal operational technique and to accommodate the outer contours of a plurality of said cylindrically shaped triple-point-of-water cells which are individually and intimately mounted with said heat conducting fixture, said heat conducting fixture having a central thermowell having a closed base end and an open entrance end for receiving a thermometer during calibration;
   (iii) a temperature probe installed in said heat conducting fixture near said closed base end of said thermowell so as to be able to sense the temperature in equilibrium with a thermometer bulb during calibration, said temperature probe provided with electrical leads electrically connecting to measuring means for measuring millivolt output values equated to temperature values in equilibrium with the triple-point-of-water temperature and an inserted thermometer bulb for calibration; and,
   (iv) a housing member for containing said mounted combination, said housing member serving to protect said mounted combination during storage and in a frozen environment during storage or during calibration of a thermometer at the triple-point-of-water standards for temperature.

2. The electronic triple point calibration system as defined in claim 1 wherein said temperature probe is electrically connected to a DC control system including an output of a predetermined value of millivolts per degree centigrade, said DC control system provided with switching means for receiving said millivolt output from said DC control system.

3. The electronic triple point calibration system as defined in claim 2 wherein said switching means are electrically connected to compressor control means, said compressor control means provided with freeze control means for generating and maintaining said electronic triple point calibration system for calibrating thermometers at the triple-point-of-water standards for temperature.

* * * * *